Nov. 18, 1958   C. M. HINES   2,860,737
INTERLOCKED PNEUMATIC AND MAGNETIC FLUID BRAKE SYSTEM
Filed May 4, 1954
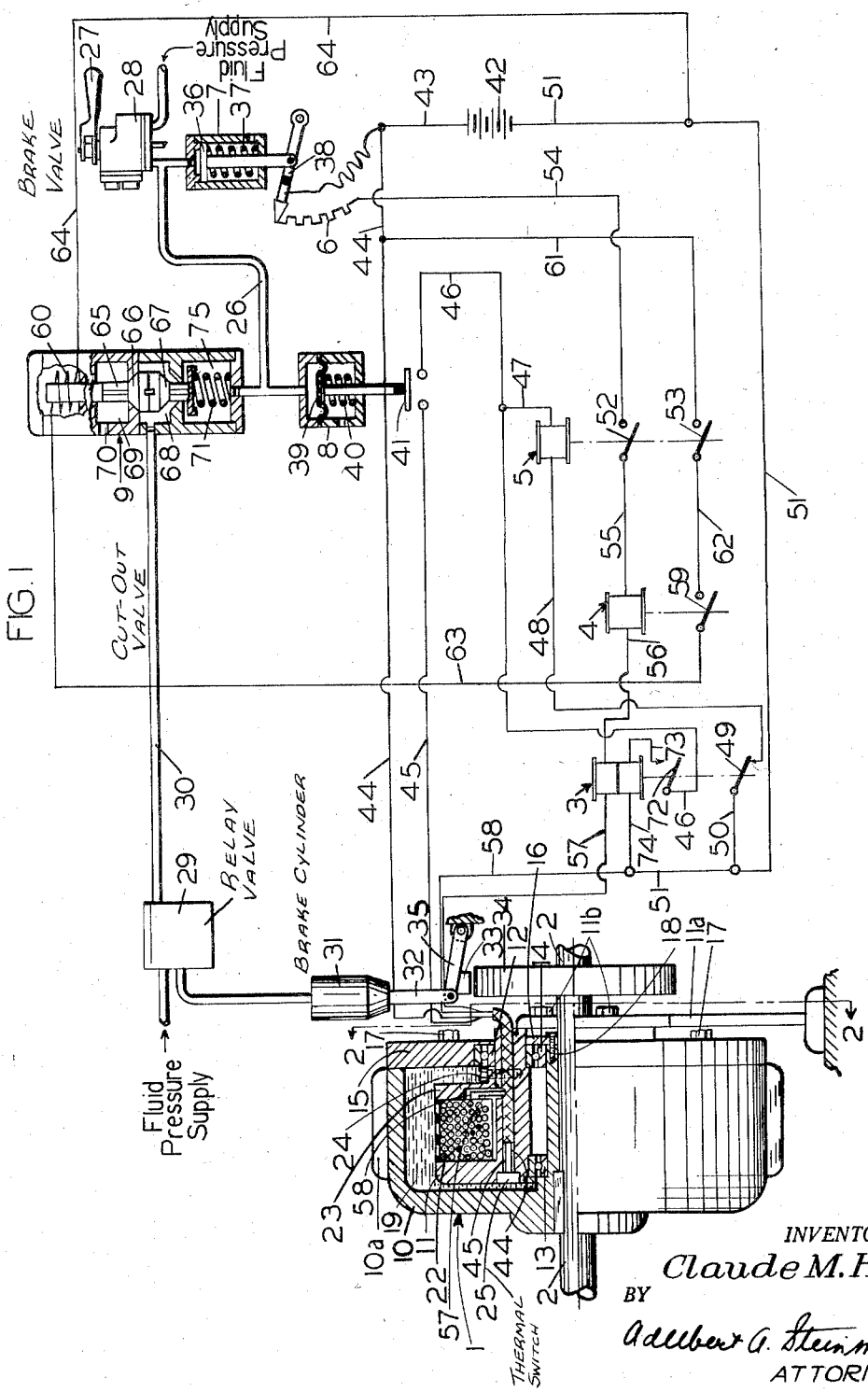
INVENTOR.
Claude M. Hines
BY
Adelbert A. Steinmiller
ATTORNEY Nov. 18, 1958  C. M. HINES  2,860,737
INTERLOCKED PNEUMATIC AND MAGNETIC FLUID BRAKE SYSTEM
Filed May 4, 1954  2 Sheets-Sheet 2
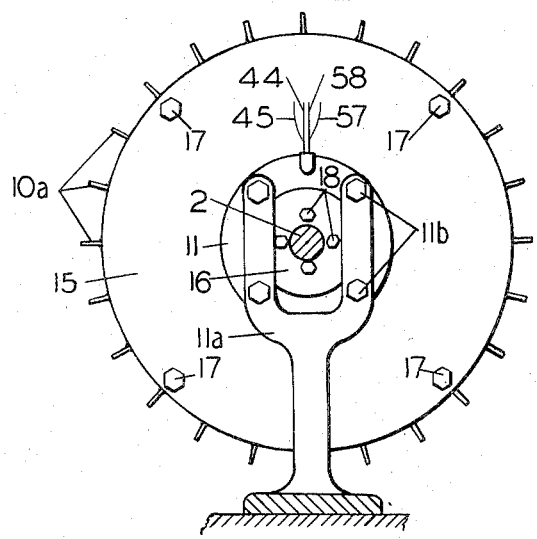
*INVENTOR.*
Claude M. Hines
BY
ATTORNEY

2,860,737

INTERLOCKED PNEUMATIC AND MAGNETIC FLUID BRAKE SYSTEM

Claude M. Hines, Verona, Pa., assignor to Westinghouse Air Brake Company, Wilmerding, Pa., a corporation of Pennsylvania Application May 4, 1954, Serial No. 427,619

15 Claims. (Cl. 188—156)

This invention relates to braking apparatus for railway vehicles or the like and more particularly to a combined fluid pressure and magnetic braking apparatus for such use.

One object of the invention is to provide a magnetic fluid or magnetic mixture brake apparatus for use with standard fluid pressure brake apparatus such as the well-known HSC railway brake equipment.

A further object of the invention is to provide such a combined brake apparatus in which the magnetic fluid or magnetic mixture brake apparatus constitutes the main braking system for the vehicle while the standard fluid pressure brake apparatus constitutes a stand-by or auxiliary brake system which will automatically become effective in case of overheating or failure of the magnetic fluid brake apparatus.

Other objects and advantages of the invention will appear in the following more detailed description thereof, taken in connection with the accompanying drawings wherein Fig. 1 is a diagrammatic view of a combined magnetic fluid and fluid pressure brake apparatus embodying the invention, and Fig. 2 is a sectional view, taken along line 2—2 of Fig. 1, showing further details of the structure and mounting of the magnetic fluid clutch.

Description

Referring to the Fig. 1, the braking apparatus comprises a magnetic fluid brake device 1 mounted on the axle 2 of the car to be braked and arranged for control by electric circuits controlled by a two-winding relay 3, two single-winding relays 4 and 5, a variable resistor 6 operated by a fluid pressure actuator 7, a fluid pressure operated switch 8, and a fluid pressure brake cut-out valve device 9.

The magnetic fluid brake device 1 comprises a rotor element or casing 10 which is attached to and rotates with the axle 2. Cooling fins 10a extend radially from rotor element 10 around the periphery thereof. Encircling the axle 2 and mounted within the rotor element 10 on suitable bearings 13 and 14 is a stator element 11 which is held against rotation as by a yoke 11a. Yoke 11a is shown as secured to the stator element 11 by four bolts 11b and to any suitable part of the car truck as by welding or some similar means. An end plate 15 is suitably attached, as by tap bolts 17, to the casing 10 to close the end thereof and form a chamber 19 within the casing for holding a magnetic fluid or mixture (hereinafter referred to as fluid) of the type used in magnetic fluid clutches and brakes. A suitable bearing race 12 may be provided, as shown between the end plate 15 and the projecting hub portion of the stator element 11 to minimize friction and wear therebetween. This bearing is desirably sealed, in a manner not shown, against entry of magnetic fluid therein. A washer 16, secured as by one or more tap bolts 18 to the end of the hub portion of rotor element 10 serves to secure the bearings 13 and 14 in place. A magnetizing coil 22 is held on the stator 11 by an end collar 23 which is secured by a bolt 24 to the stator such that when said coil is energized, the magnetic fluid in chamber 19 is magnetized so as to cause a braking effect to be exerted on the rotor according to the theory of magnetic fluid brakes.

Also mounted in the stator 11 is a thermal switch 25 which is subject to the temperature of the magnetic fluid in chamber 19 to cut out the magnetic fluid brake at a certain temperature to prevent overheating and at the same time to cut in the fluid pressure brake, as will be explained presently.

The brake apparatus also includes a fluid pressure brake portion consisting of a source of fluid pressure (not shown), the usual control pipe 26 of a fluid pressure brake equipment that is supplied with fluid from said source at a pressure which varies in direct proportion to the amount of braking desired when the handle 27 of an operator's brake valve 28 is moved to a brake application position.

Also included in the fluid pressure portion is a relay valve 29 controlled by the pressure of fluid in a relay pipe 30 to supply fluid under pressure from said source of supply to a brake cylinder 31. The brake cylinder 31 is of the usual well-known spring return type operating when supplied with fluid under pressure to actuate a brake rod 32 to press a brake shoe 33 against a brake drum 34 that is attached to and rotates with the axle 2, to effect braking of axle 2. The brake shoe 33 is attached to a pivot arm 35 which is mounted on any convenient fixed mount.

The fluid pressure in pipe 26 acts on a piston 36 in the actuator 7 to move said piston downward against a spring 37 to position a contact arm 38 of variable resistor 6 such that the current supplied to the magnetic fluid brake 1, by circuits to be described, will be sufficient to cause the magnetic fluid brake to operate to produce a braking force equivalent to that which would be obtained by the fluid pressure brake if the magnetic fluid brake were cut out, as will be explained.

The fluid pressure in pipe 26 also acts on a diaphragm 39 of the pneumatic switch 8 to move said diaphragm downward against a spring 40 and effect closure of a switch member 41 when the fluid pressure in pipe 26 exceeds a low pressure, such as five pounds per square inch pressure. Fluid under pressure from pipe 26 also is present in the cut-out valve 9 whence it may flow through said valve (as will be explained) to the relay pipe 30 and thence to the relay valve 29 of the fluid pressure brake equipment to apply the fluid pressure brakes on the axle 2, as will be explained hereinafter.

Operation

To effect a brake application with this apparatus, the operator's brake valve handle 27 is moved to brake application position to provide fluid in pipe 26 at a pressure required to provide a desired degree of brake application. The fluid pressure in pipe 26 acts on the diaphragm 39 of the switch 8 to effect prompt closing of the switch member 41. With the magnetic fluid in chamber 19 at a safe temperature (a normal condition) the thermal switch 25 will be closed, thereby completing a circuit for energizing the winding of relay 5 and causing said relay to pick up. This circuit can be traced from the positive side of the battery 42 by way of wire 43, wire 44, thermal switch 25, wire 45, closed switch member 41 of the switch device 8, wire 46, wire 47, the winding of relay 5, wire 48, closed contact member 49 of relay 3, wire 50 and wire 51 to the negative side of the battery 42.

With relay 5 energized and picked up, the contact members 52 and 53 of said relay will close, contact member 52 thereby completing a circuit for energizing and picking up relay 4 and energizing the coil 22 of the magnetic brake. This circuit can be traced from the positive side of the battery 42 by way of wire 43, the contact arm 38 of the variable resistor 6 (which is positioned by the actuator 7 to regulate the current supplied to the coil 22 to give the desired amount of braking effect by the magnetic fluid brake, as will be explained), and thence from the variable resistance 6 by way of wire 54, closed contact member 52 of relay 5, wire 55, the winding of relay 4 which is thus energized and picked up, the wire 56, the upper winding of relay 3, which is energized but not picked up due to insufficient current as will be explained hereinafter, wire 57, the coil 22, wire 58, and wire 51 to the negative side of the battery 42. Thus, with the energization of the coil 22, the magnetic fluid brake exerts a braking effect through the medium of the fluid in chamber 19 of the magnetic fluid brake to a degree corresponding to pressure of fluid in the brake control pipe 26.

Simultaneously with the application of the magnetic fluid brake, the relay 4 is picked up, thereby closing the contact member 59 of said relay and completing a circuit for energizing the solenoid 60 of the cut-out valve 9. This circuit can be traced from the positive side of the battery 42 by way of wire 43, wire 44, wire 61, closed contact member 53 of relay 5, wire 62, closed contact member 59 of relay 4, wire 63, the solenoid 60 of cut-out valve 9, wire 64, and wire 51 to the negative side of the battery 42. With solenoid 60 of the cut-out valve 9 energized, a fluted valve rod 65 will be moved downward to unseat an exhaust valve 66 and close a supply valve 67, such that fluid under pressure in pipe 26 will not have access to relay pipe 30 of the fluid pressure brake equipment and said relay pipe 30 will be vented to atmosphere through a chamber 68 in said cut-out valve past the unseated exhaust valve 66, through a chamber 69 and thence to atmosphere through port 70. Relay valve 29 is thus conditioned to vent fluid under pressure from brake cylinder 31, and the fluid pressure brake is thus released. Thus, it can be seen that while the magnetic fluid brake is in operation, the fluid pressure brake will be cut out or held released.

It should be noted herein, that the amount of braking effect obtained by the magnetic fluid brake is dependent on the degree of energization of the coil 22 which in turn is dependent on the current supplied to said coil, said current being regulated by the position of contact arm 38 of actuator 7 on the variable resistor 6 and hence in accord with the pressure of fluid in pipe 26. Thus the greater the pressure of fluid in pipe 26 acting on piston 36 against the spring 37 of actuator 7, the farther down will be the contact arm 38 thereby providing a greater degree of current in the brake energizing coil 22 and hence a correspondingly greater braking effect on the vehicle. Similarly, with decreasing fluid pressure in pipe 26, decreasing braking effect will result in the magnetic fluid brake. The degree of braking effect produced by the magnetic fluid brake for any pressure of fluid in pipe 26 is such that it is equal to the degree of braking effect that would be produced by the fluid pressure brake with the same fluid pressure in pipe 26, if the fluid pressure brake were cut in.

In the event that the temperature of magnetic fluid becomes too great during a brake application, the thermal switch 25 will automatically open due to the construction of said switch, thereby interrupting the circuit for energizing relay 5 and causing the contact members 52 and 53 of said relay to open. With contact members 52 of relay 5 open, the circuit for energizing the coil 22 of the magnetic fluid brake is interrupted and the circuit for energizing relay 4 is interrupted thus causing contact member 59 of said relay to open. Thus, the magnetic fluid brake is cut out of operation and the circuit for energizing the solenoid 60 is interrupted thereby causing the spring 71 to unseat the supply valve 67 and seat the exhaust valve 66 of the cut-off valve device 9 to operate to connect the relay pipe 30 to the pipe 26 by way of the unseated supply valve 67 and chamber 68. With fluid under pressure in relay pipe 30, the relay valve 29 operates in the usual well-known manner to supply fluid under pressure to the brake cylinder 31. The fluid under pressure in the brake cylinder 31 acts against a brake cylinder piston and spring (not shown) to move the brake cylinder rod 32 downward to cause the brake shoe 33 to contact the brake drum 39 to cause the fluid pressure brake to become effective and produce the same degree of braking effect as was provided with the magnetic fluid brake. Simultaneously with the opening of contact 59 of relay 4, the contact member 53 of relay 5 is opened to insure the deenergization of the solenoid 60. When the temperature of the magnetic fluid drops to a predetermined safe value, the thermal switch 25 automatically closes to reconnect the circuits just described and cut out the fluid pressure brakes and reapply the magnetic fluid brakes.

To release the brakes with this apparatus, the brake valve handle 27 is moved to release position in which the fluid under pressure in pipe 26 is vented to atmosphere. With pipe 26 vented, return spring 37 in the actuator 7 causes the piston 36 and thus the contact arm 38 to move upward to increase the portion of resistor 6 in the circuit for energizing the coil 22, thereby decreasing the current in the said circuit to an amount insufficient to energize coil 22 to a degree to cause any braking effect in the magnetic fluid. Similarly, the relay 4 will be deenergized and contact member 59 will drop out to open the circuit for energizing solenoid 60. Simultaneously, the return spring 40 of the switch 8 will actuate diaphragm 39 and contact member 41 to interrupt the circuit for energizing relay 5, thereby causing the contact members 52 and 53 to open. The opening of contact member 52 of relay 5 will cause the circuit for energizing the relay 4 and coil 22 to be interrupted thereby completely releasing the magnetic fluid brake. The opening of contact member 53 of relay 5 in cooperation with the opening of contact member 59 of relay 4 insures the deenergization of solenoid 60.

If during magnetic fluid braking a short-circuit should occur in the magnetic fluid brake coil 22, the current in the circuit for energizing said coil and thereby the degree of energization of relay 3 will increase to an amount sufficient to cause said relay to pick up to close a contact member 72 and open contact member 49. With contact member 49 open, the circuit for energizing relay 5 is interrupted to cause the contact members 52 and 53 to drop out, thereby cutting out the magnetic fluid brake and deenergizing the solenoid 60 to permit the fluid pressure brake to operate, thus preventing a loss of braking of the vehicle due to such short-circuiting of the coil 22. The closing of contact member 72 of relay 3 completes a holding circuit for energizing the bottom winding of relay 3 to maintain the said relay energized and the contact member 49 open for the duration of the brake application to prevent an intermittent short-circuit from causing the brakes to repeatedly alternate from fluid pressure brake to magnetic fluid brake, and vice versa. This circuit for energizing the bottom winding of relay 3 can be traced from the positive side of the battery 42 by way of wire 43, wire 44, thermal switch 25, wire 45, contact member 41 of pneumatic switch 8, wire 46, contact member 72 of relay 3, wire 73, the bottom winding of relay 3, wire 74, and wire 51 to the negative side of the battery 42.

Summary

It will now be seen that I have provided a magnetic fluid brake apparatus for braking a vehicle in response to fluid under pressure in a fluid pressure brake control pipe, wherein the fluid pressure brake apparatus constitutes a stand-by or emergency brake apparatus to become automatically effective in the event of overheating of the magnetic fluid brake or development of a faulty circuit for energizing the magnetic fluid brake, under which latter condition the magnetic fluid brake will automatically be cut out. In the event of overheating the magnetic fluid brake cutout thereof will occur only until the fluid cools to a predetermined temperature at which temperature the magnetic fluid brakes will automatically cut in again and the fluid pressure brake will be released. In the event of a short-circuit in the magnetic fluid brake, the magnetic fluid brake will be cut out and remain so during a brake application which may be in effect and then subsequently until said short-circuit is eliminated.

At all times during a brake application there is fluid under pressure in pipe 26, actuator 7, pressure switch 8 and a chamber 75 of the cut-out valve 9, such that a failure of the magnetic brake will always result in deenergization of the solenoid 60 to allow the standby fluid pressure brake to be applied. Thus, there is always one type of braking available with the magnetic fluid brake being used as the main brake and the fluid pressure brake being used as a stand-by.

Having now described the invention, what I claim as new and desire to secure by Letters Patent, is:

1. In combination, a magnetic fluid brake device having an energizing coil effective upon energization to cause said magnetic fluid brake device to exert a braking effect on a member to be braked, a normally open control circuit effective upon closure to effect energization of said coil, a fluid pressure brake device also operative to exert a braking effect on said member to be braked, and current-responsive means effective so long as said control circuit remains closed for rendering said fluid pressure brake device non-operative and effective upon opening of said circuit to cause operation of said fluid pressure brake to effect a brake application.

2. In combination, a magnetic fluid brake device having an energizing coil effective upon energization to cause said magnetic brake device to exert a braking effect on a member to be braked, a normally open control circuit effective, while closed to effect energization of said coil, a fluid pressure brake device operative upon interruption of said control circuit to exert a braking effect on said member to be braked, and thermal-responsive means effective upon the occurrence of a predetermined temperature in said magnetic fluid brake device for interrupting said control circuit.

3. In combination, a magnetic fluid brake device having an energizing coil effective upon energization to cause said magnetic fluid brake device to exert a braking effect on a member to be braked, a normally open control circuit effective while closed to effect energization of said coil, a fluid pressure brake device also operative to exert a braking effect on said member to be braked, current-responsive means effective so long as said control circuit remains closed for rendering said fluid pressure brake device non-operative and effective upon opening of said circuit to cause operation of said fluid pressure brake device to effect a brake application, and thermal-responsive means effective whenever and so long as the temperature in said magnetic fluid brake device exceeds a certain degree, for interrupting said control circuit.

4. In combination, a magnetic fluid brake device having an energizing coil effective upon energization to cause said magnetic fluid brake device to exert a braking effect on a member to be braked, a normally open control circuit effective while in a closed condition to effect energization of said coil, a fluid pressure brake device, means operative upon interruption of said control circuit to cause said fluid pressure brake device to operate to exert a braking effect on said member to be braked, circuit-interrupting means operative to interrupt said control circuit, and means responsive to an abnormally high degree of current in said control circuit, as may be caused by a short circuit, for effecting operation of said circuit-interrupting means to interrupt said control circuit.

5. In combination, a magnetic fluid brake device having an energizing coil effective upon energization to cause said magnetic fluid brake device to exert a braking effect on a member to be braked, a normally open control circuit effective while closed to effect energization of said coil, a fluid pressure brake device operative upon interruption of said circuit to exert a braking effect on said member to be braked, means responsive to an abnormally high degree of current, as may be caused by a short circuit, in said coil for interrupting said control circuit, and lock-out means for preventing said last means from operating to reclose said control circuit so long as a brake application is called for.

6. In combination, a magnetic fluid brake means, a fluid pressure brake means, a normally open control circuit means effective when closed for causing application of said magnetic fluid brake means, a fluid pressure valve means for controlling operation of said fluid pressure brake means, means for controlling the degree of energization of said control circuit means, circuit-interrupting means operative in response to more than a certain degree of energization of said control circuit means to effect interruption of said control circuit means, and means operative upon interruption of said control circuit means for causing said fluid pressure valve means to operate to effect application of said fluid pressure brake means.

7. In combination, a fluid pressure brake apparatus, a magnetic fluid brake apparatus, a control pipe, the establishment of fluid under pressure in which effects simultaneously initiation of application of both said magnetic fluid brake apparatus and said fluid pressure brake apparatus, control circuit means for controlling said magnetic fluid brake apparatus, means responsive to pressure of fluid in said control pipe for controlling the degree of energization of said control circuit means and thereby the degree of application of said magnetic fluid brake apparatus, and valve means operative so long as said control circuit is energized to a certain normal degree to cut off supply of fluid from said control pipe to effect application of said fluid pressure brake apparatus.

8. In combination, magnetic fluid brake means, fluid pressure brake means, control circuit means for controlling energization of said magnetic fluid brake means, thermal switch means responsive to overheating of said magnetic fluid brake to interrupt said control circuit and thereby deenergize said magnetic fluid brake means, and means operative upon interruption of said circuit by said thermal switch means to cause operation of said fluid pressure brake means to effect a brake application.

9. In combination, magnetic fluid brake means, fluid pressure brake means, control circuit means energizable to cause said magnetic fluid brake means to exert a braking effect, means responsive to an excessive degree of energization of said control circuit means, such as may result from a fault in said control circuit during a brake application, to deenergize said control circuit, and means effective upon deenergization of said control circuit by the last said means for causing operation of said fluid pressure brake means to effect a brake application.

10. In combination, magnetic fluid brake means, fluid pressure brake means, control circuit means adapted while energized to cause said magnetic fluid brake means to exert a braking effect, thermal-responsive means effective upon the occurrence of overheating of said magnetic fluid brake means to deenergize said control circuit, means effective upon the occurrence of an abnormally high current in said control circuit to also deenergize said control circuit, and means operative when said control circuit is deenergized by operation of either said thermal-responsive means or the last said means to cause said fluid pressure brake means to effect a brake application.

11. In combination, magnetic fluid brake means, fluid pressure brake means, current-responsive valve means effective when energized to render said fluid pressure brake means non-operative and when deenergized to render said fluid pressure brake means operative, control circuit means adapted to be energized to control said magnetic fluid brake means, thermal-responsive means, first relay means controlled by said thermal-responsive means to interrupt energization of said magnetic fluid brake means, second relay means controlled by said first relay means for controlling energization of said current-responsive valve means, and third relay means responsive to excessive current in said control circuit, as may occur in a short-circuit of said magnetic fluid brake means, to deenergize said first relay means.

12. In combination, magnetic fluid brake means, control circuit means energizable and deenergizable to control said magnetic fluid brake means, pressure-responsive means for controlling the degree of energization of said control circuit means, fluid pressure brake means, relay valve means for controlling operation of said fluid pressure brake means, valve means controlling operation of said relay valve means, means operative when said control circuit means is normally energized to render said valve means effective to prevent operation of said relay valve means non-operative, and operative when said control circuit is abnormally energized to render said valve means effective to cause said relay valve means to operate said fluid pressure brake means to effect a brake application.

13. In combination, a magnetic fluid brake means, a fluid pressure brake means, a control pipe means adapted to be charged with fluid under pressure to initiate a brake application, a source of electrical energy, control circuit means for controlling said magnetic fluid brake means, switch means operative in response to fluid pressure in said control pipe to connect said source of electrical energy to said control circuit, rheostat means responsive to pressure of fluid in said control pipe for controlling the amount of electrical energy supplied to said control circuit by said source of supply in direct proportion to the pressure of fluid in said control pipe, solenoid valve means for controlling the supply of fluid under pressure to said fluid pressure brake means, means responsive to the temperature of fluid in said magnetic fluid brakes for controlling energization of said solenoid valve means, and relay means operative in response to a fault in said magnetic fluid brake or said control circuit for controlling energization of said solenoid means to cause the supply of fluid under pressure to said fluid pressure brake means to effect a brake application when said control pipe is charged with fluid under pressure.

14. In combination, a magnetic fluid brake device having an energizing coil effective upon energization to cause said magnetic fluid brake device to exert a braking effect on a member to be braked, a normally open control circuit effective while in a closed condition to effect energization of said coil, a fluid pressure brake device, means operative upon establishment of a closed condition of said control circuit to render said fluid pressure brake device inoperative and operative upon interruption of said control circuit to cause said fluid pressure brake device to operate to exert a braking effect on said member to be braked, circuit-interrupting means operative to interrupt said control circuit, and means responsive to an abnormally high degree of current in said control circuit for effecting operation of said circuit interrupting means to interrupt said control circuit.

15. In combination, magnetic fluid brake means, fluid pressure brake means, control circuit means energizable to effect application of said magnetic fluid brake means and deenergizable to effect release thereof, a brake applying pipe chargeable with fluid under pressure to effect application of said fluid pressure brake means, a control pipe, brake valve means operative to cause fluid under pressure to be supplied to said control pipe and at the same time to effect energization of said control circuit means, and valve means effective in one position to establish communication through which fluid under pressure is supplied from said control pipe to said brake applying pipe and effective in a second position to prevent supply of fluid under pressure from the control pipe to the brake applying pipe, and means effective so long as the control circuit means is energized for causing the said valve means to assume its said second position.

References Cited in the file of this patent

UNITED STATES PATENTS

| 1,805,630 | McCune | May 19, 1931 |
| 2,219,518 | Engle et al. | Oct. 29, 1940 |